Oct. 30, 1923.
C. ANDRADE, JR
1,472,452
DIFFERENTIAL
Filed Sept. 2, 1922
3 Sheets-Sheet 1

INVENTOR

Oct. 30, 1923.  C. ANDRADE, JR  1,472,452
DIFFERENTIAL
Filed Sept. 2, 1922    3 Sheets-Sheet 2

Witness
Guy W. Hodges
Eleanor Haight

INVENTOR
Cipriano Andrade Jr.

Oct. 30, 1923.  1,472,452
C. ANDRADE, JR
DIFFERENTIAL
Filed Sept. 2, 1922  3 Sheets-Sheet 3
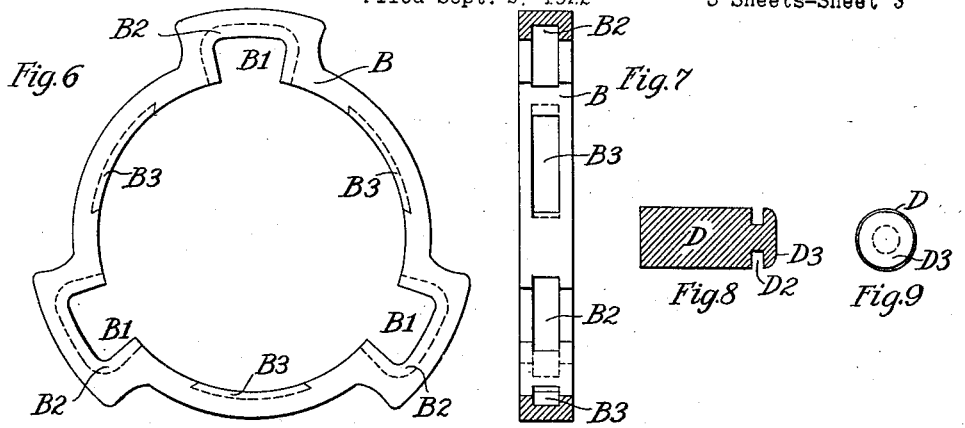
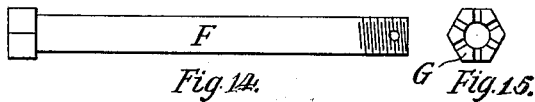
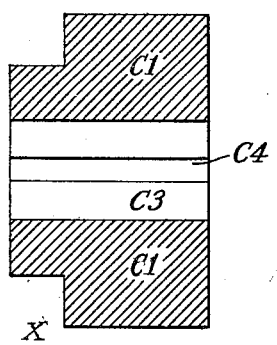
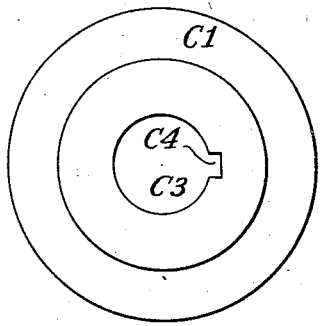
INVENTOR Patented Oct. 30, 1923.

1,472,452

UNITED STATES PATENT OFFICE.

CIPRIANO ANDRADE, JR., OF NEW YORK, N. Y.

DIFFERENTIAL.

Application filed September 2, 1922. Serial No. 585,843.

*To all whom it may concern:*

Be it known that I, CIPRIANO ANDRADE, Jr., a citizen of the United States, residing at New York, in the county of New York and State of New York, have invented a new and useful Differential, of which the following is a specification.

My invention relates to roller locking differentials; and the objects of my invention are, to provide a differential more simple in construction and more efficient in function than those now in use.

I attain these objects by the mechanism illustrated in the accompanying drawings, in which—

Figure 1:
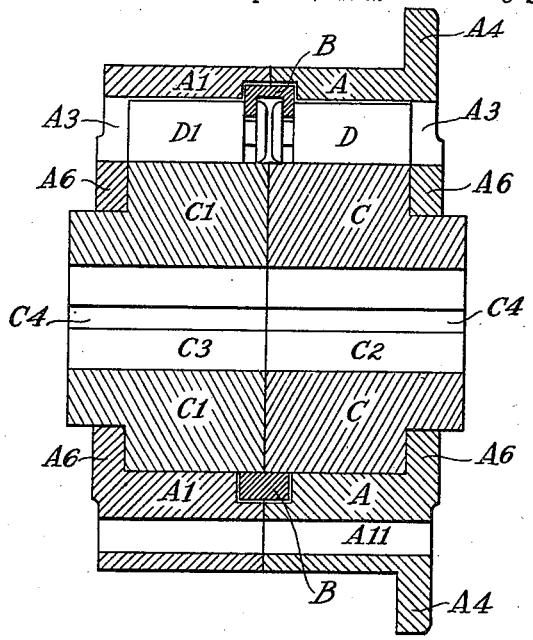
Figure 2:
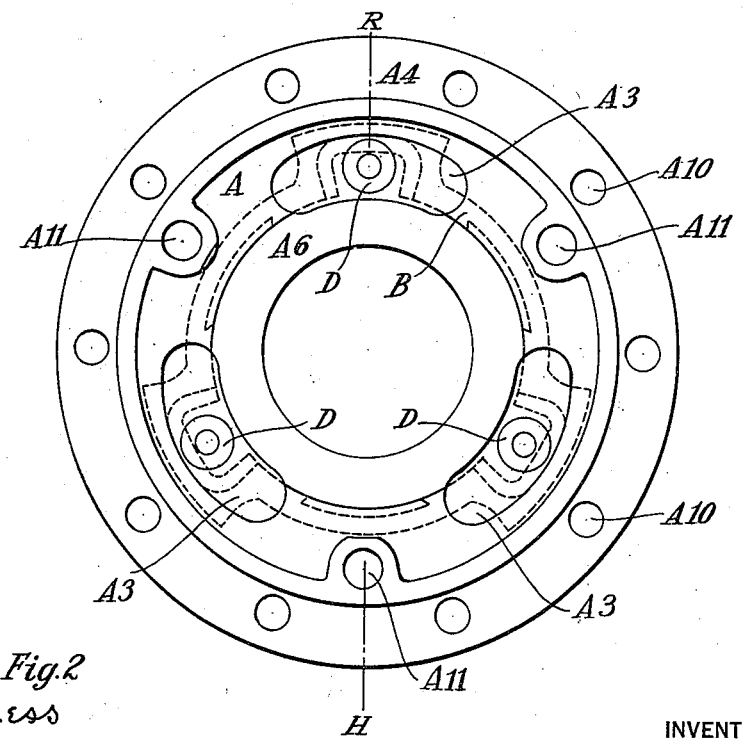
Figure 3:
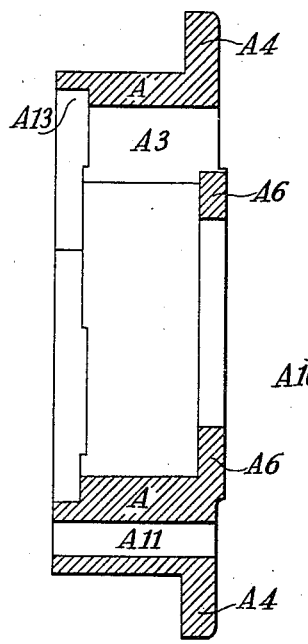
Figure 4:
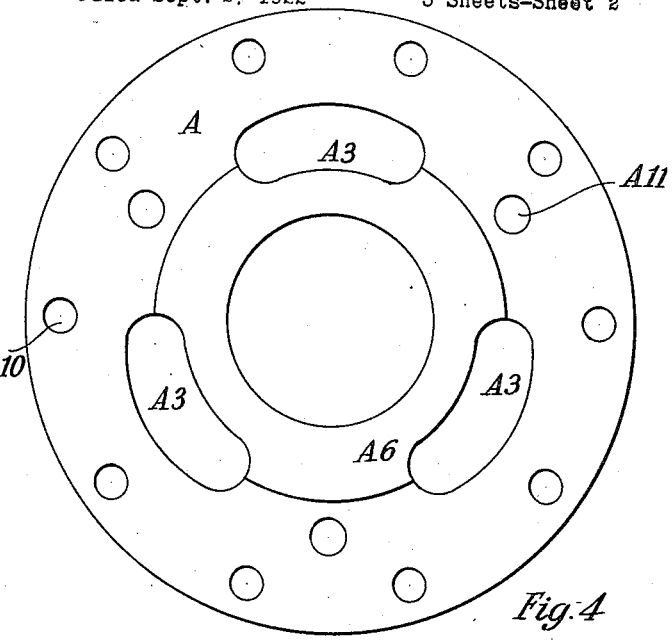
Figure 5:
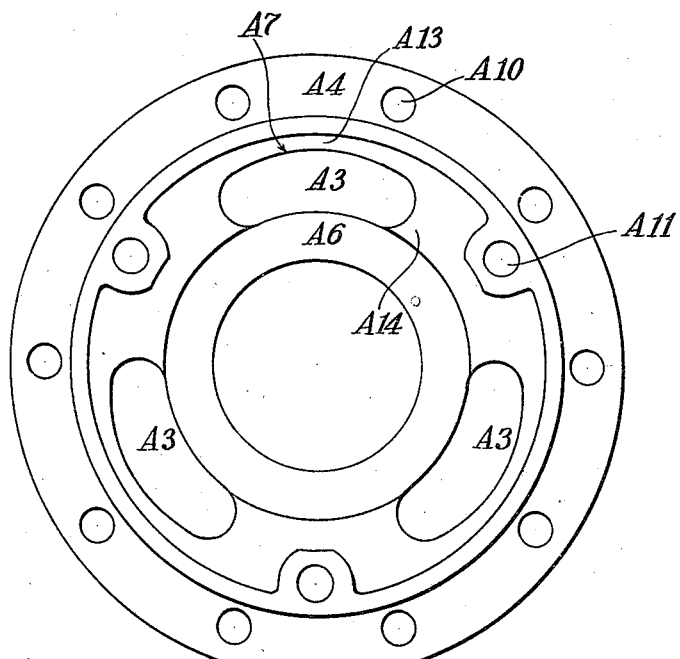

Figure 1 is a longitudinal section elevation of the entire device on the line R H of Fig. 2; Fig. 2 is an end view of a part of the device; Fig. 3 is a longitudinal section elevation of the driving member A on the line R H of Fig. 2; Fig. 4 is an outside end view of driving member A; Fig. 5 is an inside end view of driving member A; Fig. 6 is an end view of control member B; Fig. 7 is longitudinal section elevation of control member B on the line R H of Fig. 2; Fig. 8 is a detail longitudinal section elevation of the locking member D; Fig. 9 is an end view of the locking member D; Fig. 10 is a longitudinal section elevation of the driven member $C^1$; Fig. 11 is an outside end view of driven member $C^1$; Fig. 12 is an end view of spring E; Fig. 13 is a plan view of spring E; Fig. 14 is a side view of bolt F; and Fig. 15 is an end view of nut G.

Similar letters refer to similar parts throughout the several views.

A and $A^1$ together form the driving member. They are identical in all respects except that A has flange $A^4$ with holes $A^{10}$ to which may be affixed a bevel tooth gear or other mechanical device to impart rotative motion to A. A and $A^1$ are held together by bolts F which pass through holes $A^{11}$ and are fastened by nuts G, thus locking A and $A^1$ together so as to prevent any relative motion whatever between A and $A^1$. Driving member $AA^1$ has transverse openings $A^3$, whose outer periphery $A^7$ is so formed that the radial width of $A^3$ is greater at the centre of said outer periphery than at the ends of said outer periphery. Driving member $AA^1$ has flanges $A^6$ to lock driven members C and $C^1$ from longitudinal motion. Driving member $AA^1$ also has in its middle a circumferential groove $A^{13}$ with bearing surface $A^{14}$ which contains control member B.

Control member B is of such shape and size as to have little or no frictional contact with $AA^1$. Control member B has transverse openings $B^1$ which hold the lock ends $D^3$ of locking membes D. Openings $B^1$ have flange edges $B^2$ which lock into the grooves $D^2$ of locking members D and $D^1$, and which permit locking members D and $D^1$ to rotate freely on their own axes, and to travel to a limited degree circumferentially in relation to control member B; but which hold the axes of locking members D and $D^1$ at all times parallel with the axis of driving member $AA^1$, with the axis of locking member B, and with the axes of driven members C and $C^1$. Control member B is provided on its inner circumference with grooves $B^3$ which hold springs E. Springs E exert a constant but gentle pressure on driven members C and $C^1$. Grooves $B^3$ and spring E may or may not be used in my device according to the particular conditions of function which the device is to perform.

Driven members C and $C^1$ have circular holes $C^3$ with keyways $C^4$ to take the ends of the driven shafts.

In Fig. 2, to facilitate the identification of the various members, the control member B is shown wholly in dotted lines.

The operation of my device is that of a reversible roller locking differential with a multiplicity of rollers on each driven member. The object of the spring E is to facilitate the locking of rollers D and $D^1$ into transverse openings $A^3$.

I claim:

1. In a differential; a driving member with a plurality of recesses in its inner surface, each of said recesses having each of its sides lower than its central portion; a first and a second driven member with outer surfaces containing no recesses, said outer surfaces of said driven members being inside of the said recesses in the inner surface of the driving member; a first set of locking rollers between the said outer surface of the first driven member and one end of the recesses in the driving member, only one roller being in each recess, and adapted to lock or unlock their said adjacent members either in a forward or reverse direction; a second set of locking rollers between the said outer surface of the second driven member and the other end of the recesses in the driving member, only one roller being in each recess, and adapted to lock or unlock their said adjacent members either in a forward or reverse direction; and a single ringlike control member having a plurality of elongated recesses receiving one end of the rollers, whereby the rollers have independent movement circumferentially of the control member.

2. In a differential; a driving member with a plurality of recesses in its inner surface, each of said recesses having each of its sides lower than its central portion; a first and a second driven member with outer surfaces containing no recesses, said outer surfaces of said driven members being inside of the said recesses in the inner surface of the driving member; a first set of locking rollers between the said outer surface of the first driven member and one end of the recesses in the driving member, only one roller being in each recess, and adapted to lock or unlock their said adjacent members either in a forward or reverse direction; a second set of locking rollers between the said outer surface of the second driven member and the other end of the recesses in the driving member, only one roller being in each recess, and adapted to lock or unlock their said adjacent members either in a forward or reverse direction; and a single ringlike control member having a plurality of elongated recesses receiving one end of the rollers whereby the rollers have independent movement circumferentially of the control member, and whereby the first set of locking rollers may move to a limited extent in relation to the second set of locking rollers about the periphery of said driven members, and whereby the first set of locking rollers are held to a limited circumferential motion relatively to each other about the said outer surface of the first driven member, and whereby the second set of locking rollers are held to a limited circumferential motion relatively to each other about the said outer surface of the second driven member.

CIPRIANO ANDRADE, Jr.

Witnesses:
JAMES W. BAILEY,
ELEANOR HAIGHT.